(12) United States Patent
Salter et al.

(10) Patent No.: US 10,479,267 B2
(45) Date of Patent: Nov. 19, 2019

(54) LIGHT ASSEMBLY FOR VEHICLE AND METHOD OF FORMING THE SAME

(71) Applicant: Ford Global Technologies, LLC, Dearborn, MI (US)

(72) Inventors: Stuart C. Salter, White Lake, MI (US); Paul Kenneth Dellock, Northville, MI (US); Heather M. Flores, Dearborn, MI (US); Aaron Bradley Johnson, Allen Park, MI (US); Linsheng Chen, Woodbury, MN (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 123 days.

(21) Appl. No.: 15/644,874

(22) Filed: Jul. 10, 2017

(65) Prior Publication Data
US 2019/0009711 A1 Jan. 10, 2019

(51) Int. Cl.
| | |
|---|---|
| *B60Q 1/32* | (2006.01) |
| *F21V 5/04* | (2006.01) |
| *B29C 45/16* | (2006.01) |
| *B29D 11/00* | (2006.01) |
| *F21S 43/14* | (2018.01) |
| *F21S 43/33* | (2018.01) |
| *F21S 45/47* | (2018.01) |
| *F21S 43/236* | (2018.01) |
| *F21Y 115/10* | (2016.01) |
| *B29K 509/04* | (2006.01) |
| *B29L 11/00* | (2006.01) |
| *B29L 31/30* | (2006.01) |
| *B29L 31/00* | (2006.01) |
| *B60R 3/02* | (2006.01) |

(52) U.S. Cl.
CPC ............. *B60Q 1/323* (2013.01); *B29C 45/16* (2013.01); *B29D 11/00605* (2013.01); *F21S 43/14* (2018.01); *F21S 43/236* (2018.01); *F21S 43/33* (2018.01); *F21S 45/47* (2018.01); *F21V 5/048* (2013.01); *B29K 2509/04* (2013.01); *B29K 2995/003* (2013.01); *B29L 2011/0091* (2013.01); *B29L 2031/30* (2013.01); *B29L 2031/747* (2013.01); *B60Q 2400/40* (2013.01); *B60R 3/02* (2013.01); *F21Y 2115/10* (2016.08)

(58) Field of Classification Search
CPC .... B60Q 1/323; B60Q 1/2607; B60Q 1/2696; F21V 7/06
See application file for complete search history.

(56) References Cited

U.S. PATENT DOCUMENTS

| | | | | |
|---|---|---|---|---|
| 4,332,321 A | * | 6/1982 | Wratschko | A45D 27/00 206/228 |
| 4,912,845 A | * | 4/1990 | Inoue | B26B 19/16 30/43.4 |
| 5,135,406 A | * | 8/1992 | Ishikawa | H01R 27/00 439/131 |
| 5,915,830 A | | 6/1999 | Dickson et al. | |

(Continued)

*Primary Examiner* — Joseph L Williams
(74) *Attorney, Agent, or Firm* — Carlson, Gaskey & Olds, P.C.

(57) ABSTRACT

A light assembly for a motor vehicle according to an exemplary aspect of the present disclosure includes, among other things, a light source, and a lens arrangement configured to direct light from the light source in a first direction toward a running board and a second direction away from the vehicle. A method is also disclosed.

16 Claims, 4 Drawing Sheets

(56) References Cited

U.S. PATENT DOCUMENTS

| | | |
|---|---|---|
| 6,244,734 B1 | 6/2001 | Hulse |
| 9,162,614 B1 | 10/2015 | Wang |
| 9,499,093 B1 | 11/2016 | Salter et al. |
| 2008/0037266 A1 | 2/2008 | Cunnien |
| 2016/0347240 A1* | 12/2016 | Salter ................. H05B 33/0845 |
| 2017/0190282 A1* | 7/2017 | Salter .................... B60Q 1/323 |

* cited by examiner

LIGHT ASSEMBLY FOR VEHICLE AND METHOD OF FORMING THE SAME

BACKGROUND

This disclosure relates to a light assembly for a motor vehicle and a method of forming the same.

Sport utility vehicles (SUVs) and other vehicles, such as four wheel drive (4WD) vehicles, have a relatively high ground clearance, meaning the floor is at a relatively high elevation above the ground. The increased ground clearance makes it difficult for some users to enter and exit the vehicle.

Running boards are known, and have been used to provide assistance for entering and exiting vehicles with a high ground clearance. Some retractable running board assemblies (sometimes referred to as power running board assemblies or electric running board assemblies) include a running board that is pivotally connected the vehicle by one or more linkages. The linkages are driven by an actuator, which together are configured to move the running board between a retracted position (sometimes referred to as a "stowed" position) and a deployed position. Some vehicles include a light assembly that illuminates the running board in the deployed position, which is useful when a user is entering or exiting the vehicle at night or during low-light conditions.

SUMMARY

A light assembly for a motor vehicle according to an exemplary aspect of the present disclosure includes, among other things, a light source, and a lens arrangement configured to direct light from the light source in a first direction toward a running board and a second direction away from the vehicle.

In a further non-limiting embodiment of the foregoing light assembly, the lens arrangement comprises a first outer optic and a second outer optic. Further, the first outer optic is configured to direct light in the first direction and the second outer optic is configured to direct light in the second direction.

In a further non-limiting embodiment of any of the foregoing light assemblies, the first outer optic is a lens.

In a further non-limiting embodiment of any of the foregoing light assemblies, the second outer optic is a light tube.

In a further non-limiting embodiment of any of the foregoing light assemblies, the assembly further includes a reflector housing having a reflective surface. Further, the first and second outer optics are supported by the reflector housing.

In a further non-limiting embodiment of any of the foregoing light assemblies, the reflector housing includes a boron-nitrate material.

In a further non-limiting embodiment of any of the foregoing light assemblies, the reflector housing is provided by a polycarbonate resin with between 2-8% boron nitride.

In a further non-limiting embodiment of any of the foregoing light assemblies, the assembly further includes an outer housing. The reflector housing is at least partially mounted within the outer housing, and the outer housing includes a recess receiving at least a portion of the light source.

In a further non-limiting embodiment of any of the foregoing light assemblies, the light source includes a light emitting diode and a printed circuit board, and at least a portion of the printed circuit board is received in the recess.

In a further non-limiting embodiment of any of the foregoing light assemblies, the lens arrangement includes a near-field lens adjacent the light source. The near-field lens includes a first portion configured to direct light to the reflective surface and a second portion configured to direct light to the second outer optic.

In a further non-limiting embodiment of any of the foregoing light assemblies, the second portion of the near-field lens is a collimator.

In a further non-limiting embodiment of any of the foregoing light assemblies, the first portion of the near-field lens is a plano-concave lens.

In a further non-limiting embodiment of any of the foregoing light assemblies, the reflector housing is arranged such that the reflective surface directs light from the near-field lens to the first outer optic.

A motor vehicle according to an exemplary aspect of the present disclosure includes, among other things, a running board and a light assembly including a light source and a lens arrangement. The lens arrangement is configured to direct light from the light source in a first direction toward the running board and a second direction away from the vehicle.

In a further non-limiting embodiment of the foregoing motor vehicle, the lens arrangement comprises a first outer optic and a second outer optic. The first outer optic is configured to direct light in the first direction and the second outer optic configured to direct light in the second direction.

In a further non-limiting embodiment of any of the foregoing motor vehicles, the light assembly comprises a reflector housing having a reflective surface, and the first and second outer optics are supported by the reflector housing.

In a further non-limiting embodiment of any of the foregoing motor vehicles, the lens arrangement comprises a near-field lens adjacent the light source. The near-field lens includes a first portion configured to direct light to the reflective surface and a second portion configured to direct light to the second outer optic.

A method according to an exemplary aspect of the present disclosure includes, among other things, forming a reflector housing including a reflective surface. Further, the reflector housing is formed as a single piece with a near-field lens and an outer optic.

In a further non-limiting embodiment of the foregoing method, the forming step includes a two-shot molding process in which the near-field lens and the outer optic are formed before the reflector housing, and then the reflector housing is molded-over the near-field lens and the outer optic.

In a further non-limiting embodiment of any of the foregoing methods, the reflector housing is made of a polymer material having between 2-8% boron nitride.

DETAILED DESCRIPTION

This disclosure relates to a light assembly for a motor vehicle and a method of forming the same. In one example, the light assembly includes a light source and a lens arrangement, which may include one or more lenses. The lens arrangement is configured to direct light from the light source in a first direction toward a running board and a second direction away from the vehicle. Thus, a single light source is used to illuminate a running board and provide a running light.

Figure 1:
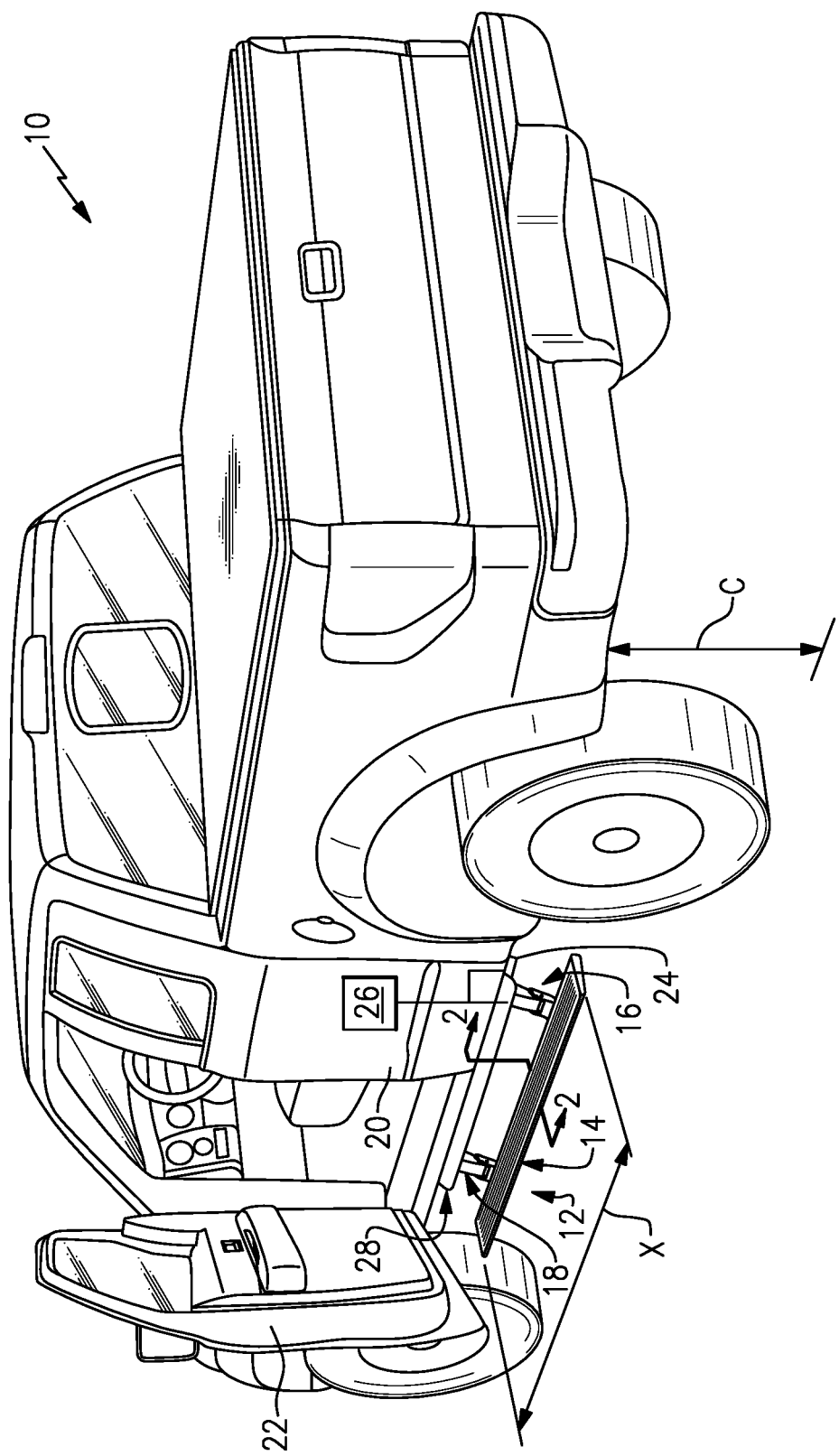
FIG. 1 is a rear-perspective view of a motor vehicle with an example retractable running board assembly and a light assembly.

Referring to the drawings, FIG. 1 is a rear-perspective view of a motor vehicle 10. The vehicle 10 has a relatively high clearance C, which is a distance between a ground surface and a floor of the vehicle 10. As shown, the vehicle 10 is a truck. While a truck is pictured, this disclosure is also applicable to sport utility vehicles (SUVs) and other types of vehicles having a high ground clearance.

The vehicle 10 includes a retractable running board assembly 12 moveable between a deployed position, which is the position shown in FIG. 1, and a retracted position. In this example, the retractable running board assembly 12 includes a running board 14 and first and second linkages 16, 18 rotatably connecting the running board 14 to a vehicle body 20, which includes the frame and paneling of the vehicle 10. The running board 14 has a length X that at least spans a width of a door 22 of the vehicle 10. When in the deployed position, a user may step on the running board 14 as they enter and exit the vehicle 10.

In this example, the first linkage 16 is directly coupled to a motor 24, which is configured to move the running board 14 between a retracted position and a deployed position. In one example, the motor 24 is in communication with a controller 26, which instructs the motor 24 to move the running board 14 to the deployed position when the door 22 is opened, and further instructs the motor 24 to move the running board 14 to the retracted position when the door 22 is closed.

The controller 26 is shown schematically in FIG. 1. It should be understood that the controller 26 could be part of an overall vehicle control module, such as a vehicle system controller (VSC), or could alternatively be a stand-alone controller separate from the VSC. Further, the controller 26 may be programmed with executable instructions for interfacing with and operating the various components of the vehicle 10. The controller 26 additionally includes a processing unit and non-transitory memory for executing the various control strategies and modes of the vehicle system.

In one example, the motor 24 is an electric motor, and is responsive to instructions from the controller 26 to selectively to adjust a position of the first linkage 16. The second linkage 18 is configured to move in response to movement of the first linkage 16. In other words, the second linkage 18 is a follower linkage. In another example, however, the second linkage 18 could be directly coupled to the motor 24 and the first linkage 16 could be a follower linkage. Further, while two linkages 16, 18 are illustrated in FIG. 1, this disclosure extends to retractable running board assemblies having one or more linkages.

While a retractable running board assembly is shown in FIG. 1, it should be understood that this disclosure extends to running board assemblies that are not retractable. That is, while a two-position (i.e., retracted/stowed and deployed) running board assembly is shown in FIG. 1, it should be understood that this disclosure extends to running board assemblies that are stationary (i.e., single, deployed position only).

Figure 2:
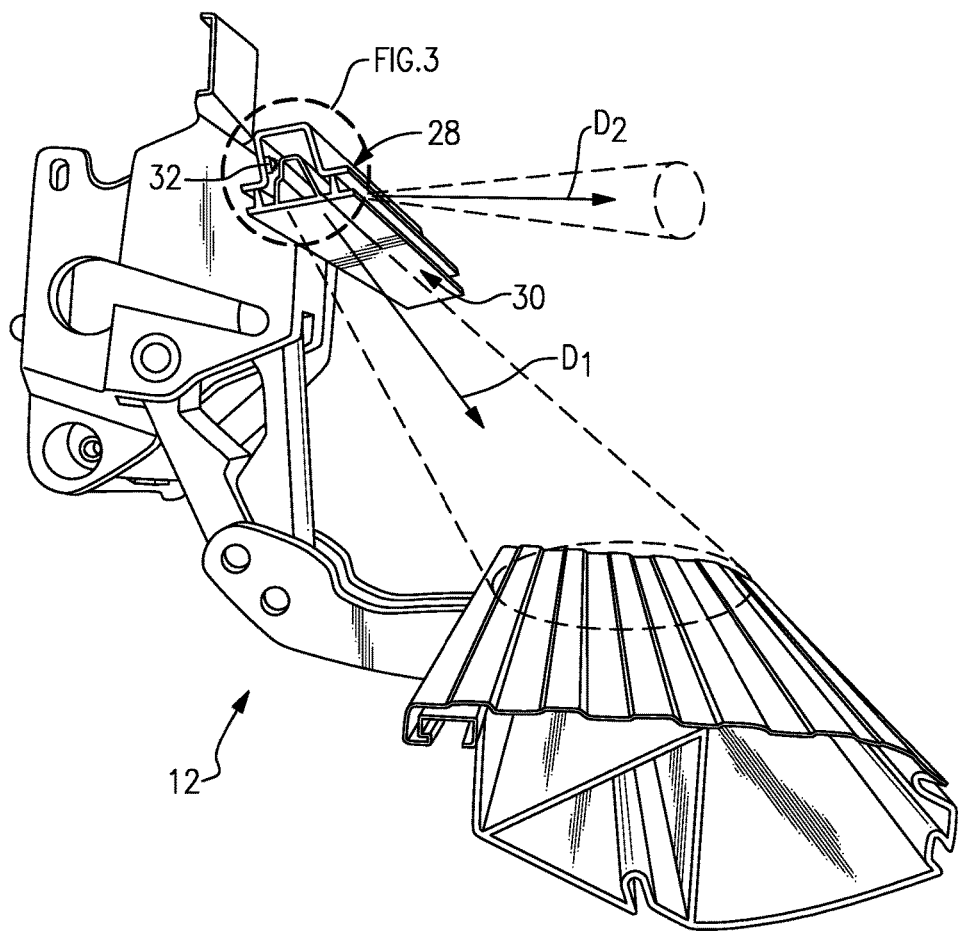
FIG. 2 is a cross-sectional view taken along line 2-2 and illustrates an example retractable running board assembly and a light assembly without the remainder of the vehicle, for purposes of illustration.
Figure 3:
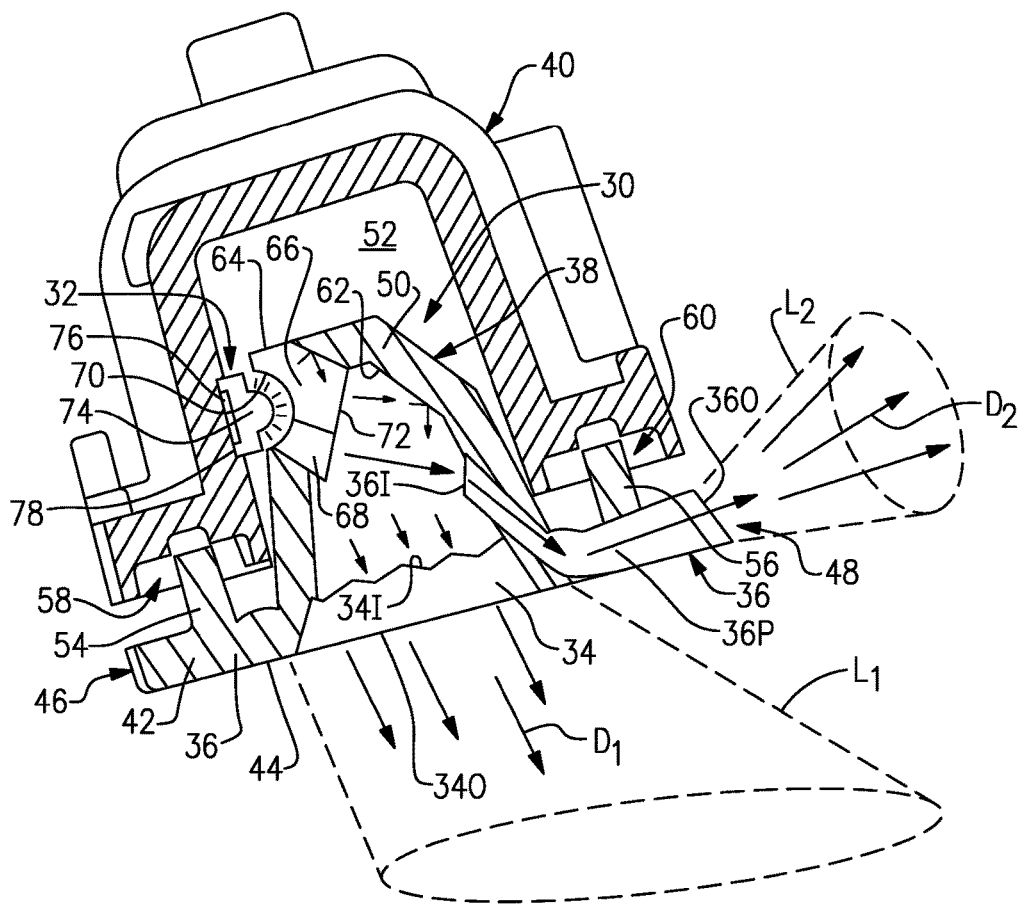
FIG. 3 is a close-up view of the light assembly of FIG. 2.

The vehicle 10 further includes a light assembly 28. The light assembly 28 is configured to illuminate the running board 14 and simultaneously provide a vehicle running light. With reference to FIGS. 2-3, the light assembly 28 includes a lens arrangement 30 including at least one lens configured to direct light from a light source 32 in a first direction $D_1$ toward the running board 14 and a second direction $D_2$ away from the vehicle 10. The light directed in the second direction $D_2$ provides a running light along a side of the vehicle 10. It should be understood that certain aspects of the light assembly 28 are exaggerated in the Figures for purposes of illustration only.

In this example, the light source 32 is controlled by the controller 26. The controller 26 controls the light source 32, in one example, such that the light source 32 is on when the vehicle 10 is on. That is, when the vehicle 10 is on, the lens arrangement 30 directs light in the first and second directions $D_1$, $D_2$ simultaneously. Thus, when the running board 14 is in a deployed position, the running board 14 is illuminated and the running light is on. When the running board 14 is retracted, the running light is still on and light is still projected toward the first direction $D_1$, although the retracted position of the running board 14 may substantially block the light intended to illuminate a deployed running board 14. The controller 26 could control the light source 32 such that it deactivates the light source 32 in certain conditions. Further, it should be understood that this disclosure extends to other control strategies.

The light assembly 28 includes at least one housing supporting the lens arrangement 30 and the light source 32. As shown in FIG. 3, the lens arrangement 30 includes a first outer optic 34 and a second outer optic 36. The first outer optic 34 is configured to direct light from the light assembly 28 in the first direction $D_1$, and the second outer optic 36 is configured to direct light from the light assembly 28 in the second direction $D_2$.

In this example, the first outer optic 34 is a lens, and the second outer optic 36 is a light tube. In particular, the first outer optic 34 is a Fresnel lens, having a substantially planar outer surface 340 and an inner surface 341 with a plurality of sharp, raised features. The first outer optic 34 produces a light cone $L_1$ in the direction $D_1$, which illuminates the running board 14.

The second outer optic 36 is a light tube, and includes an inlet 36I, outlet 36O, and a tube portion 36P configured to transmit light from the inlet 36I to the outlet 36O. The second outer optic 36 produces a light cone $L_2$ in the direction $D_2$, which provides a running light along a side of the vehicle 10. It should be understood that the first and second outer optics 34, 36 could be provided by different optical structures, including different types of lenses and light tubes. For example, the first outer optic 34 could be provided by a light tube, and the second outer optic 36 could be provided by a lens. In other examples, the second outer optic 36 is provided by a light pipe or a light blade.

The first and second outer optics 34, 36 are supported by a reflector housing 38 in this example. In turn, the reflector housing 38 is supported by an outer housing 40. The reflector housing 38 may be snap-fit relative to the outer housing 40 for ease of assembly. Other attachment techniques come within the scope of this disclosure, however.

The reflector housing 38 includes an outer wall 42 with an outer surface 44 extending between first and second sides 46, 48. The reflector housing 38 further includes a dome 50 projecting at least partially into a socket 52 in the outer housing 40. In this example, the reflector housing 38 also includes flanges 54, 56 adjacent the sides 46, 48 and projecting from the outer wall 42 for engagement with corresponding sockets 58, 60 in the outer housing 40. The flanges 54, 56 and sockets 58, 60 may provide a snap-fit connection between the reflector housing 38 and the outer housing 40.

The reflector housing 38 is made of a polymer material having reflective properties. In one example, the reflector housing 38 includes boron-nitride material. In one particular example, the reflector housing 38 includes between 2-8% boron-nitride, with the balance of the reflector housing 38 made of a polymer material. In one example, the polymer material is provided by a polycarbonate resin. Boron-nitride provides the reflector housing 38 with reflective properties, which do not diminish the quality of light from the light source 32.

In one example, an interior surface 62 of the dome 50 of the reflector housing 38 provides a reflective surface. In that example, the interior surface 62 is provided with a reflective coating. In another example, there is no reflective coating, and the reflective properties of the interior surface 62 are provided by the material of the reflector housing 38. The interior surface 62 of the dome 50 is concave when viewed from the perspective of the first outer optic 34, for example.

In addition to the first and second outer optics 34, 36, the lens arrangement 30 also includes a near-field lens 64 adjacent the light source 32. The near-field lens 64 includes a first portion 66 and a second portion 68. The first portion 66, in this example, is configured to direct light to the interior surface 62 of the dome 50, which then reflects light to the first outer optic 34. The second portion 68 is configured to direct light to the second outer optic 36. Thus, the near-field lens 64 refracts light in two different ways.

In this example, the first portion 66 of the near-field lens 64 is a plano-concave lens. In that example, a surface 70 of the first portion 66 facing the light source 32 is concave, and a surface 72 facing the interior surface 62 is substantially planar. The second portion 68 is a collimator, in this example, which receives light from the light source 32 and produces parallel beams of light directed toward the inlet 36I of the second outer optic 36. Providing the near-field lens 64 with first and second portions 66, 68 efficiently and effectively directs light from a single source to the first and second outer optics 34, 46.

All light leaving the light assembly 28 is refracted twice—once by the near-field lens 64 and once by either the first or second outer optic 34, 36. The arrangement provides two types of vehicle lighting (i.e., running board illumination and running light), and does so without diminishing light quality (i.e., light leaving the light assembly 28 is bright) using a low-cost and easily manufactured assembly.

In one example of this disclosure, the light source 32 is provided by a light emitting diode (LED) 74, which is coupled to a printed circuit board (PCB) 76. The PCB 76 is electrically coupled to the controller 26, and the light source 32 is operable in response to instructions from the controller 26. The light source 32 could be a strip or series of LEDs controlled by a single PCB, or could include a plurality of discrete spaced-apart LEDs, each with their own PCB. In examples where there are multiple LEDs, the light is still refracted twice before it leaves the light assembly 28 as described above relative to FIG. 3.

During use, the light source 32 generates heat. In order to dissipate that heat, in this example the outer housing 40 includes a recess 78 configured to receive at least a portion of the light source 32. In particular, the recess 78 receives at least a portion of the PCB 76. Thus, the outer housing 40 provides a heat sink for the light source 32.

Figure 4:
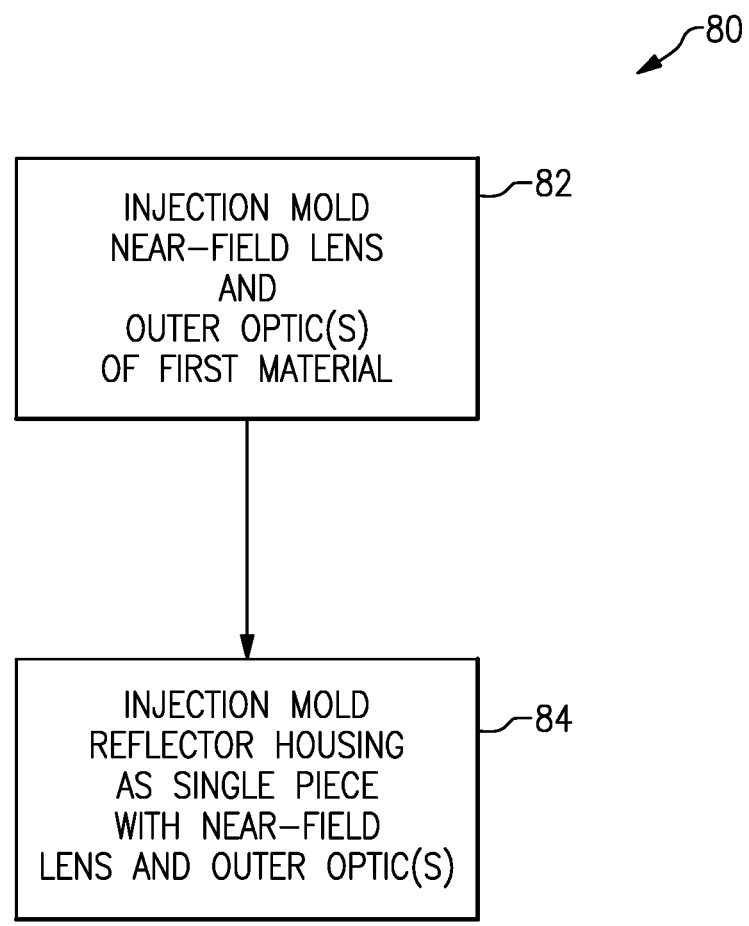
FIG. 4 is a flow chart representative of an example method of forming a light assembly.

FIG. 4 is a flow chart representative of a method 80 of forming the first and second outer optics 34, 36, the reflector housing 38, and the near-field lens 64. In one example, method 80 involves a two-shot or double-shot molding process. In that process, at 82, the lens arrangement 30, including the first and second outer optics 34, 36 and the near-field lens 64 is formed of a first material by injection molding. The first material may be a glass material. The first material may also be an acrylic material or polymethyl methacrylate (PMMAC), as other examples.

The lens arrangement 30 is allowed to cool in the mold cavity. Within the same mold cavity, at 84, the reflector housing 38 is injection molded over the lens arrangement 30 to provide a single, integrated piece with the lens arrangement. The reflector housing 38 is formed by injection molding the above-discussed material, which may be a polymer material with between 2-8% boron nitride, over the already-formed lens arrangement 30. This process is sometimes referred to as overmolding, wherein material is added over already-existing pieces or parts using a molding process. The result is an integrated component including the original piece(s) and the additional material added via the overmolding process.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A light assembly for a motor vehicle, comprising:
   a light source; and
   a lens arrangement configured to direct light from the light source in a first direction toward a running board and a second direction away from the vehicle,
   wherein the lens arrangement comprises a first outer optic and a second outer optic, the first outer optic configured to direct light in the first direction and the second outer optic configured to direct light in the second direction, and
   wherein the first outer optic is a lens.

2. The light assembly as recited in claim 1, wherein the second outer optic is a light tube.

3. The light assembly as recited in claim 1, further comprising:
   a reflector housing having a reflective surface, the first and second outer optics supported by the reflector housing.

4. The light assembly as recited in claim 3, wherein the reflector housing includes a boron-nitrate material.

5. The light assembly as recited in claim 4, wherein the reflector housing is provided by a polycarbonate resin with between 2-8% boron nitride.

6. The light assembly as recited in claim 3, further comprising:
   an outer housing, the reflector housing at least partially mounted within the outer housing, wherein the outer housing includes a recess receiving at least a portion of the light source.

7. The light assembly as recited in claim 6, wherein the light source includes a light emitting diode and a printed circuit board, wherein at least a portion of the printed circuit board is received in the recess.

8. The light assembly as recited in claim 3, wherein the lens arrangement comprises a near-field lens adjacent the light source, the near-field lens including a first portion configured to direct light to the reflective surface and a second portion configured to direct light to the second outer optic.

9. The light assembly as recited in claim 8, wherein the second portion of the near-field lens is a collimator.

10. The light assembly as recited in claim 9, wherein the first portion of the near-field lens is a plano-concave lens.

11. The light assembly as recited in claim 8, wherein the reflector housing is arranged such that the reflective surface directs light from the near-field lens to the first outer optic.

12. A motor vehicle, comprising:
a running board; and
a light assembly including a light source and a lens arrangement configured to direct light from the light source in a first direction toward the running board and a second direction away from the vehicle,
wherein the lens arrangement comprises a first outer optic and a second outer optic, the first outer optic configured to direct light in the first direction and the second outer optic configured to direct light in the second direction,
wherein the light assembly comprises a reflector housing having a reflective surface, the first and second outer optics supported by the reflector housing.

13. The motor vehicle as recited in claim 12, wherein the lens arrangement comprises a near-field lens adjacent the light source, the near-field lens including a first portion configured to direct light to the reflective surface and a second portion configured to direct light to the second outer optic.

14. A method, comprising:
forming a reflector housing including a reflective surface, the reflector housing formed as a single piece with a near-field lens and an outer optic.

15. The method as recited in claim 14, wherein the forming step includes a two-shot molding process, wherein the near-field lens and the outer optic are formed before the reflector housing, and then the reflector housing is molded-over the near-field lens and the outer optic.

16. The method as recited in claim 15, wherein the reflector housing is made of a polymer material having between 2-8% boron nitride.

* * * * *